United States Patent [19]

Jennings et al.

[11] Patent Number: 4,473,993

[45] Date of Patent: Oct. 2, 1984

[54] CUTTING ANGLE ADJUSTMENT MECHANISM FOR CROP HARVESTING MACHINES

[75] Inventors: Richard E. Jennings; Delmar C. Harer, both of New Holland, Pa.

[73] Assignee: Sperry Corporation, New Holland, Pa.

[21] Appl. No.: 498,377

[22] Filed: May 26, 1983

[51] Int. Cl.³ .......................................... A01D 55/32
[52] U.S. Cl. ...................................... 56/208; 56/192; 56/DIG. 11
[58] Field of Search ...................... 56/10.4, 11.9, 15.2, 56/15.5, 15.8, 192, 208–217, DIG. 11

[56] References Cited

U.S. PATENT DOCUMENTS

| | | | |
|---|---|---|---|
| 1,891,428 | 12/1932 | Le Bleu | 56/DIG. 11 |
| 2,319,458 | 5/1943 | Hornish | 56/DIG. 11 |
| 3,613,336 | 10/1971 | Smith | 56/11.9 |
| 3,643,407 | 2/1972 | Hubbard et al. | 56/208 |
| 3,995,411 | 12/1976 | Johnson | 56/11.9 |
| 4,085,571 | 4/1978 | Mortier et al. | 56/208 |
| 4,177,625 | 12/1979 | Knight et al. | 56/208 |
| 4,212,144 | 7/1980 | Raineri | 56/208 |

*Primary Examiner*—Gene Mancene
*Assistant Examiner*—John G. Weiss
*Attorney, Agent, or Firm*—Larry W. Miller; Frank A. Seemar; Darrell F. Marquette

[57] ABSTRACT

A mechanism for changing the cutting angle of the cutterbar on a crop harvestng machine, such as a mower-conditioner or windrower, relative to the ground is disclosed wherein the cutting angle can be changed while the harvesting machine is being operated. This on-the-go adjustment mechanism includes a hydraulic cylinder positioned as the top link between the frame of the harvesting machine and the header in which the cutterbar is mounted. Changes in the length of the hydraulic cylinder affect a pivotal movement of the header about the lower links interconnecting the frame and the header to change the angle of the cutterbar relative to the ground. By connecting the cutting angle adjustment cylinder to the hydraulic circuit for the header lift cylinders and by sizing the bore of the angling cylinder such that its stroke is activated prior to activation of the lift cylinders, the cutterbar cutting angle can be varied from the operator's seat through manipulation of the hydraulic control lever for the header lift system while the machine is in motion cutting crop. An adjustment bracket is provided with various stop settings to control the range of the adjustment of the cutting angle obtainable through manipulation of the angling cylinder.

16 Claims, 5 Drawing Figures

CUTTING ANGLE ADJUSTMENT MECHANISM FOR CROP HARVESTING MACHINES

BACKGROUND OF THE INVENTION

The present invention relates generally to crop harvesting machines, such as mower-conditioners or windrowers, having a header floatingly connected to the frame by upper and lower links and, more particularly, to a mechanism for changing the cutting angle of the cutterbar mounted in the header while the harvesting machine is in motion harvesting standing crop.

It is well known in the art to provide a header operatively mounting a cutterbar and other harvesting apparatus, including a reel and an auger, connected to the frame of the crop harvesting machine for motion relative thereto. Generally, upper and lower links interconnecting an upper portion and a lower portion, respectively, of the header to the frame permit the header to be moved generally vertically with respect to the ground and the frame to provide a floating movement of the header to better follow undulations in the ground surface. The cutterbar is normally mounted at the forward end of the crop harvesting header to sever standing crop material and initiate the crop harvesting process. It has been found that the angle of the cutterbar relative to the ground, i.e., the cutting angle of the cutterbar, must be varied to correspond to different operating conditions to maintain optimum cutting and feeding of severed crop over the cutterbar, minimize guard and knife damage, and maintain a cutting height close to the ground.

Present crop harvesting machines provide for adjustment of the cutterbar cutting angle by varying the attachment points of the upper links and/or varying the length of the upper links themselves. Such adjustments are manually accomplished when the crop harvesting machine is stationary and prior to the usage of the machine to harvest crop. One known prior art mechanism for changing the cutterbar cutting angle includes the utilization of a turnbuckle within the upper link to change the length thereof, but manipulation of the turnbuckle must also be done while the machine is stationary. It has been found that operating conditions can vary within the same field of standing crop material and it would be inconvenient and time consuming to stop the harvesting machine to adjust the cutting angle with every change in operating condition. Yet, it is desirable for optimum efficiency to change the cutting angle to correspond to the operating condition being encountered. It would therefore be particularly desirable to provide the capability to change the cutterbar cutting angle while on-the-go.

SUMMARY OF THE INVENTION

It is an object of this invention to overcome the aforementioned disadvantages of the prior art by providing an on-the-go cutterbar cutting angle adjustment mechanism for crop harvesting machines.

It is another object of this invention to utilize a hydraulic cylinder as the upper link connecting the floating header to the frame of a crop harvesting machine to permit on-the-go cutterbar cutting angle adjustment.

It is an advantage of this invention that the cutterbar cutting angle can be changed without stopping the harvesting machine.

It is a feature of this invention that optimum cutterbar feeding and cutting efficiencies can be maintained throughout varying operating conditions.

It is still another object of this invention to connect the angling cylinder to the hydraulic circuit for the header lift system so that the angling cylinder and the lift cylinders can be operated from a single control lever.

It is another feature of this invention that the angling cylinder can be activated throughout its stroke before the lift cylinders are activated.

It is another advantage of this invention that separate hydraulic controls for the angling cylinder do not have to be provided.

It is yet another object of this invention to provide an adjustment mechanism cooperable with the angling cylinder to vary the range of cutterbar cutting angle adjustment.

It is still another feature of this invention that the adjustment mechanism can be utilized to lock the cutterbar in a transport position.

It is a further object of this invention to provide a mechanism for changing the cutting angle of a crop harvesting machine cutterbar which is durable in construction, inexpensive of manufacture, carefree of maintenance, facile in assemblage, and simple and effective in use.

These and other objects, features and advantages are accomplished according to the instant invention by providing a mechanism for changing the cutting angle of the cutterbar on a crop harvesting machine, such as a mower-conditioner or windrower, relative to the ground wherein the cutting angle can be changed while the harvesting machine is being operated. This on-the-go adjustment mechanism includes a hydraulic cylinder positioned as the top link between the frame of the harvesting machine and the header in which the cutterbar is mounted. Changes in the length of the hydraulic cylinder affect a pivotal movement of the header about the lower links interconnecting the frame and the header to change the angle of the cutterbar relative to the ground. By connecting the cutting angle adjustment cylinder to the hydraulic circuit for the header lift cylinders and by sizing the bore of the angling cylinder such that its stroke is activated prior to activation of the lift cylinders, the cutterbar cutting angle can be varied from the operator's seat through manipulation of the hydraulic control lever for the header lift system while the machine is in motion cutting crop. An adjustment bracket is provided with various stop settings to control the range of the adjustment of the cutting angle obtainable through manipulation of the angling cylinder.

BRIEF DESCRIPTION OF THE DRAWINGS

The advantages of this invention will become apparent upon consideration of the following disclosure of the invention, especially when taken in conjunction with the accompanying drawings wherein.

DETAILED DESCRIPTION OF THE PREFERRED EMBODIMENT

Figure 1:
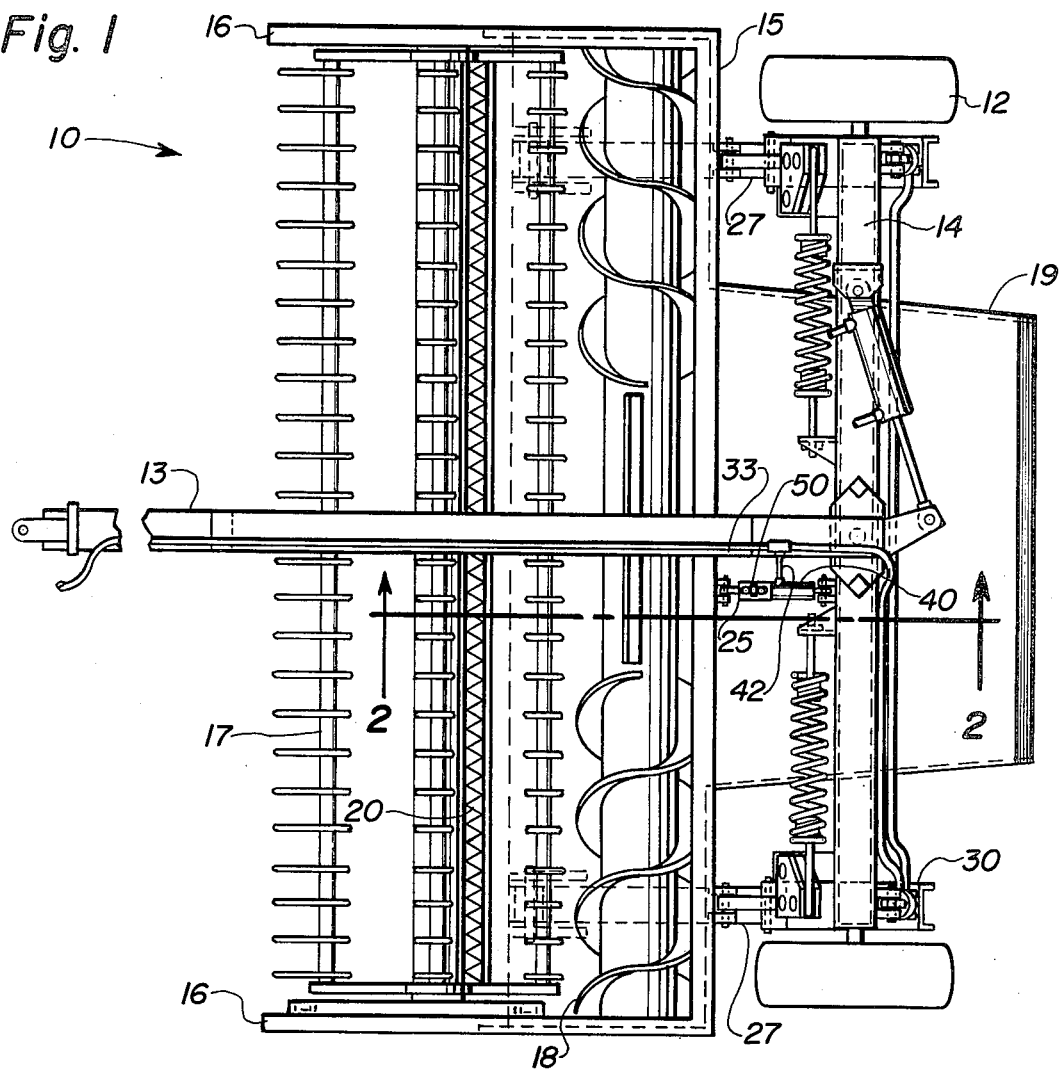
FIG. 1 is a top plan view of a crop harvesting machine, commonly referred to a pivot tongue windrower, incorporating the principles of the instant invention.

Referring now to the drawings and, particularly, to FIG. 1, a top plan view of a crop harvesting machine, commonly referred to as a pivot tongue windrower, can be seen. The crop harvesting machine 10 includes a wheeled frame 12, having a longitudinally extending draft member 13 and an upper transverse main beam 14, and a header 15 floating connected for movement relative to the main frame 12. The header 15 is generally provided with a reel 17 operatively mounted between opposing side sheets 16. Because the machine 10 depicted in FIG. 1 is of the type commonly referred to as a windrower, an auger 18 is also operatively mounted between the opposing side sheets 16 to consolidate crop material to be discharged through a centrally disposed windrow former 19.

Figure 2:
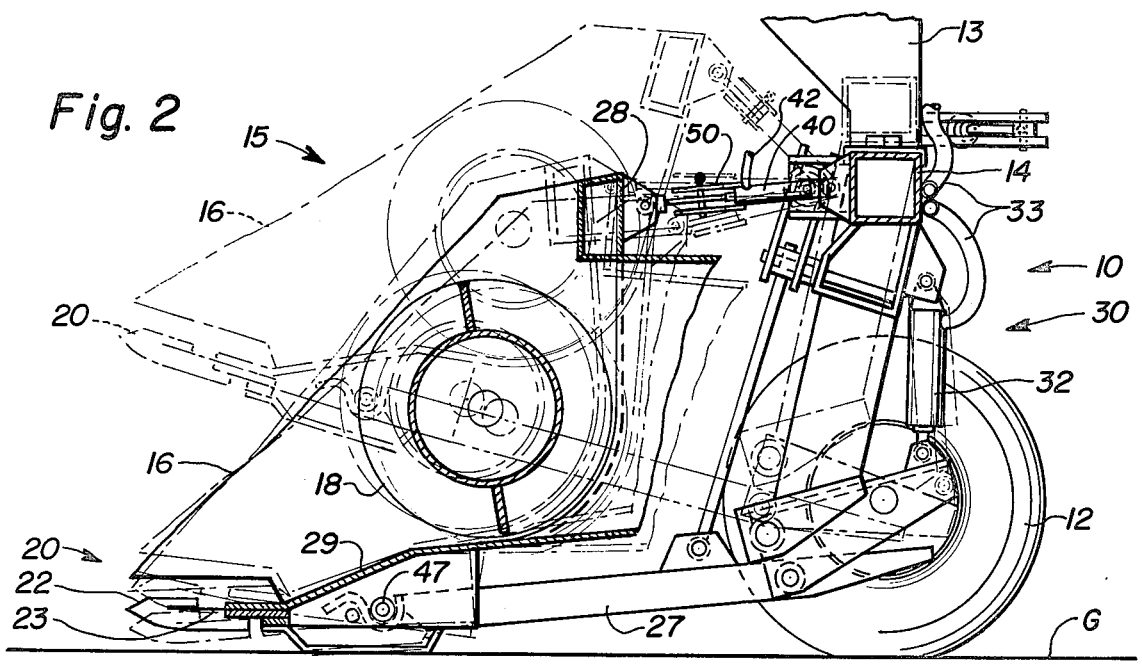
FIG. 2 is a partial cross-sectional view of the crop harvesting machine seen in FIG. 1 taken along lines 2—2, the range of cutterbar cutting angle adjustment and the position of the header after activation of the header lift cylinder being shown in phantom.

A cutterbar 20 is provided at the forward end of the header 15 between the opposing side sheets 16 to sever standing crop material and initiate the crop harvesting process. The cutterbar 20 depicted in FIGS. 1 and 2 is of the reciprocating variety and, therefore, includes a plurality of knife guards 22 transversely spaced along the length of the cutterbar 20 and a plurality of knives 23 mounted for reciprocating movement relative to the guards 22 for cooperation therewith to sever standing crop material by a shearing action. The header 15 is connected to the frame 12 by an upper link 25 and lower links 27 interconnecting upper and lower portions 28,29, respectively, of the header 15 to corresponding portions of the frame 12. A header lift mechanism 30, including a pair of lift cylinders 32 connected to a reservoir of hydraulic fluid by hoses 33, operatively interconnects the frame 12 and the lower links 27 to affect a raising of the header 15 to the position shown in phantom in FIG. 2.

According to the instant invention, the upper link 25 includes a hydraulic angling cylinder 40 connected to the hydraulic circuit for the header lift mechanism 30 by the hydraulic hose 42. The angling cylinder 40 is shown as a single acting cylinder in which an increase in hydraulic pressure effects a shortening of the angling cylinder 40 drawing the upper portion 28 of the header 15 rearwardly toward the frame 12. By connecting the ram 44 of the hydraulic angling cylinder 40 to the upper portion 28 of the header 15, a manipulation of the hydraulic controls for the angling cylinder 40 effects a pivotal movement of the header 15 about the connection 47 between the lower links 27 and the lower portion 29 of the header 15. As can be seen in phantom in FIG. 2, this pivotal movement of the header about the pivot connection 47 causes the angle of the cutterbar 20 relative to the ground G to vary accordingly.

Figure 3:
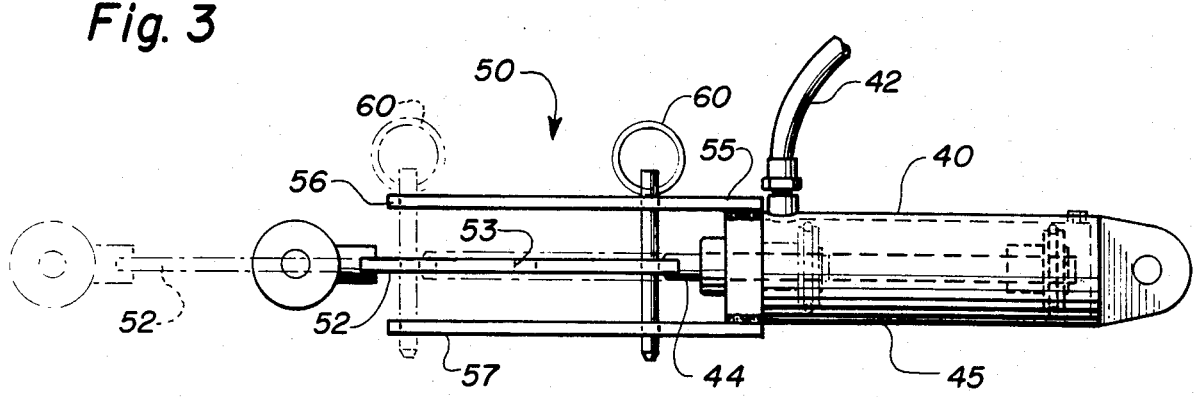
FIG. 3 is an enlarged side elevational detailed view of the cutting angle adjustment mechanism, the range of movement of the mechanism being shown in phantom.
Figure 4:
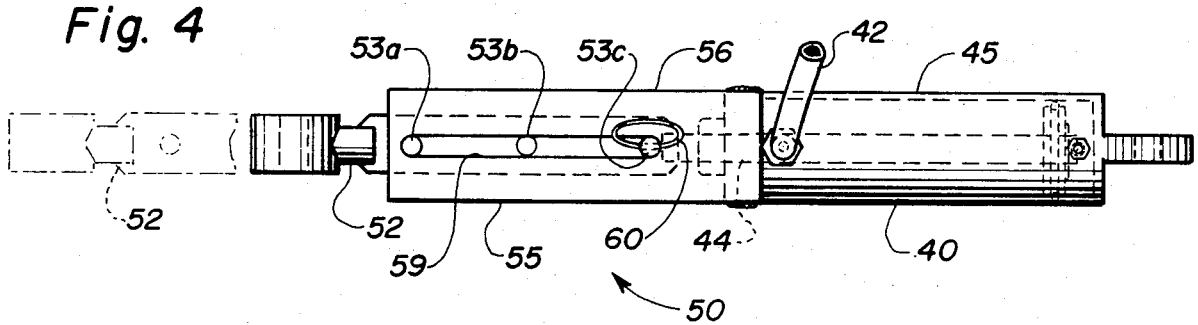
FIG. 4 is an enlarged top plan view of the cutting angle adjustment mechanism as seen in FIG. 3, the range of movement of the mechanism being shown in phantom.
Figure 5:
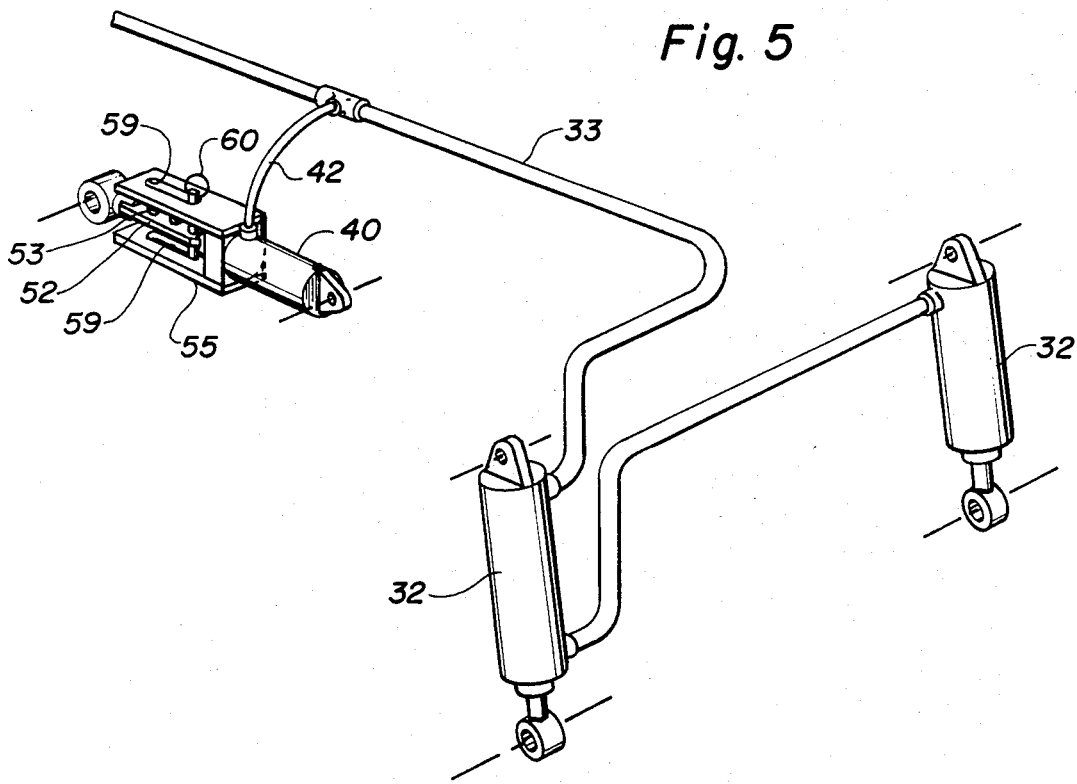
FIG. 5 is a schematic view of the hydraulic circuit to the angling cylinder and the header lift cylinders.

The upper link 25 also includes an adjustment mechanism 50 connected to the angling cylinder 40 for varying the range of adjustment of the cutterbar cutting angle effected by manipulation of the angling cylinder 40. The adjustment mechanism 50 includes a slide member 52 interconnecting the ram 44 and the upper portion 28 of the header 15. As is best seen in FIGS. 3 and 4, the slide member 52 has a plurality of holes 53 extending generally vertically therethrough. The adjustment mechanism 50 further includes a bracket member 55 connected to the barrel 45 of the angling cylinder 40 so as to have the slide member 52 positioned between opposing halves 56,57. Each half 56,57 of the bracket member 55 includes a slot-shaped opening 59 therethrough, extending parallel to the line of movement of the ram 44.

The slot-shaped openings 59 are alignable with the holes 53 extending through the slide member 52. By positioning a pin 60 through the slot-shaped openings 59 and one of the holes 53, the range of cutting angle adjustment can be selectively varied. For example, positioning the pin 60 through the hole 53a would not permit the ram 44 of the angling cylinder 40 to extend because of the interference with the bracket member 55, thereby locking the angling cylinder in a fixed, or transport, position. Because of the length of the slot-shaped openings 59 are substantially equal to the length of stroke of the angling cylinder 40, a positioning of the pin 60 through the hole 53c would permit the use of the entire stroke of the angling cylinder 40 to affect an adjustment of the cutting angle of the cutterbar 20. Similarly the positioning of the pin 60 through hole 53b would somewhat limit the range of adjustment that could be affected by manipulation of the angling cylinder 40.

By connecting the angling cylinder 40 to the hydraulic circuit for the lift cylinders 32 and by sizing the angling cylinder 40 relative to the lift cylinders 32 so that the stroke of the angling cylinder is activated to change prior to activation of the lift cylinders 32, the operation of both the angling cylinder 40 and the lift cylinders 32 can be operated through a single hydraulic control (not shown). By sizing the angling cylinder 40 to operate at a pressure in the range of 100 pounds per square inch and the lift cylinders to be operable at a pressure of about 1200 pounds per square inch, the ram 44 of the angling cylinder 40 will be completely retracted before the lift cylinders 32 are acutated. Accordingly, the instant invention can be incorporated into a crop harvesting machine 10 for optimum control, at minimum expense and with no additional tractor requirements.

In operation, the crop harvesting machine 10 is transported with the lift cylinders 32 extended to raise the header 15 into its transport position, as shown in phantom in FIG. 2. During operation of the harvesting machine 10 to sever crop material, the pressure on the lift cylinders 32 is reduced to permit the header 15 to lower into its operating position, as seen in solid lines in FIG. 2. With the pin 60 positioned through the hole 53c in the slide member 52, the operator can select the desired cutting angle of the cutterbar 20 relative to the ground G by manipulation of the hydraulic pressure to the angling cylinder 40. One skilled in the art will readily realize that changes in the hydraulic pressure to manipulate the angling cylinder 40 would not affect any movement of the lift cylinders 32 because of the relative disparity in operating pressure between the angling cylinder 40 and the lift cylinder 32.

When operating conditions change and the operator wishes to vary the cutting angle of the cutterbar 20, he merely has to change the pressure of the hydraulic fluid going to the angling cylinder 40 to effect a desired position of the cutterbar 20 relative to the ground G, as seen in phantom in FIG. 2. One skilled in the art will readily realize that with the single acting cylinder 40 a reduction in the hydraulic pressure in the angling cylinder will permit the weight of the header 15 pivoting about the pivot connection 47 to extend the ram 44. An increase in pressure to the hydraulic cylinder 40 correspondingly affects a retraction of the ram 44 and a tilting back of the upper portion 28 of the header 15.

When it is desirable to change the harvesting machine 10 from its operating position to its transport position, the pressure in the hydraulic hose 33 is increased, causing first a complete retraction of the ram 44 into the barrel 45 of the angling cylinder 40 and then an extension of the lift cylinders 32 to raise the header 15 to the transport position shown in phantom in FIG. 2. If desirable, a repositioning of the pin 60 into the hole 53a in the slide member 52 will lock the angling cylinder 40 to prevent any extension of the ram 44 and, thereby, fix the cutting angle of the cutterbar 20. With pin 60 through the hole 53a, the upper link 25 in effect becomes a rigid link and the on-the-go cutting angle adjustment capabilities are completely eliminated.

Although the preferred embodiment provides for the use of a hydraulic cylinder 40 tied into the header lift circuit to change the angle of the header with respect to the ground, alternative embodiments can also provide an on-the-go header adjustment mechanisms. One such embodiment would be the substitution of an electric motor coupled to a screw device for the hydraulic angling cylinder 40 to effect a selective change in the length of the upper link 25 to adjust the angle of the header. Another alternative embodiment would be the use of a pair of hydraulic angling cylinders 40 at opposing ends of the header, rather than a single cylinder at the central part of the machine. This pair of angling cylinders could be arranged in a master-slave relationship.

It will be understood that changes in the details, materials, steps and arrangement of parts which have been described and illustrated to explain the nature of the invention, will occur to and may be made by those skilled in the art upon a reading of the disclosure within the principles and scope of the invention. The foregoing description illustrates preferred embodiments of the invention. However, concepts, as based upon such a description, may be employed in other embodiments without departing from the scope of the invention. Accordingly, the following claims are intended to protect the invention broadly, as well as in the specific form shown herein.

Having thus described the invention, what is claimed is:

1. In a crop harvesting machine having a frame adapted for movement across a field; a crop harvesting header mounted on said frame for movement relative thereto, said header including a transversely extending cutterbar for severing standing crop from the field to initiate the crop harvesting process; a lower linkage means for pivotally connecting a lower portion of said header to said frame; an upper linkage means for connecting an upper portion of said header to said frame; and header lift means interconnecting said frame and said header to move said header in a generally vertical direction through a plurality of elevated positions, the improvement comprising:

said upper linkage means including a first hydraulic cylinder connected to a hydraulic circuit for selectively changing the effective length of said first hydraulic cylinder to cause a pivotal movement of said header about said lower linkage and vary the cutting angle of said cutterbar relative to the ground in any one of said elevated positions of said header.

2. The crop harvesting machine of claim 1 wherein said lift means includes a second hydraulic cylinder operable to effect said vertical movement of said header, said second hydraulic cylinder being connected to said hydraulic circuit.

3. The crop harvesting machine of claim 2 wherein both said first and second hydraulic cylinders are connected in parallel to the same hydraulic circuit, said first hydraulic cylinder operating at a significantly lower pressure than said second hydraulic cylinder so that said first hydraulic cylinder can be operated through its entire effective length before a change in the pressure in said hydraulic circuit operates said second hydraulic circuit to effect a raising of said header relative to the ground.

4. The crop harvesting machine of claim 3 wherein said first hydraulic cylinder is connected to a stroke adjustment means for selectively varying the usable stroke of said first hydraulic cylinder.

5. The crop harvesting machine of claim 4 wherein said stroke adjustment means includes a slide member interconnecting the ram of said first hydraulic cylinder and said header and having a plurality of holes therethrough, a bracket member having a slot-shaped opening therethrough alignable with said holes, and a pinning member removably positionable through said opening and one of said holes.

6. The crop harvesting machine of claim 5 wherein said slot-shaped opening has a length substantially equal to the length of stroke of said first hydraulic cylinder and is aligned substantially parallel to the direction of movement of said first hydraulic cylinder ram.

7. The crop harvesting machine of claim 6 wherein said holes are positioned such that the positioning of said pinning member through a first hole permits the utilization of substantially all of the stroke of said first hydraulic cylinder to vary the cutting angle of said cutterbar relative to the ground and the positioning of said pinning member through a second hole permits substantially none of said first hydraulic cylinder stroke to be utilized so that said cutterbar can be locked in a fixed position.

8. In a crop harvesting machine having a frame adapted for movement across a field; a crop harvesting header mounted on said frame for movement relative thereto, said header including a transversely extending cutterbar for severing standing crop from the field to initiate the crop harvesting process, said cutterbar being disposed at a cutting angle relative to the ground; a lower linkage means for pivotally connecting a lower portion of said header to said frame; an upper linkage means for connecting an upper portion of said header to said frame, said upper and lower linkage means pivotally connecting said header to said frame to permit a generally vertical movement of said header relative to said frame; and header lift means operably associated with said lower linkage means to effect said generally vertical movement of said header through a plurality of elevated positions relative to the ground, the improvement comprising:

cutting angle adjustment means for varying the cutting angle of said cutterbar relative to the ground in any one of said elevated positions independently of said header lift means while said crop harvesting machine is in operative motion harvesting said standing crop.

9. The crop harvesting machine of claim 8 wherein said cutting angle adjustment means is operatively associated with said upper linkage means to change the effective length thereof to cause said header to pivot about the pivotal connection with said lower linkage means and change the cutting angle of said cutterbar.

10. The crop harvesting machine of claim 9 wherein said cutting angle adjustment means includes a first hydraulic cylinder forming a part of said upper linkage means.

11. The crop harvesting machine of claim 10 wherein said first hydraulic cylinder is connected to a stroke adjustment means for selectively varying the usable stroke of said first hydraulic cylinder.

12. The crop harvesting machine of claim 11 wherein said stroke adjustment means includes a slide member interconnecting the ram of said first hydraulic cylinder and said header and having a plurality of holes therethrough, a bracket member having a slot-shaped opening therethrough alignable with said holes, and a pinning member removably positionable through said opening and one of said holes.

13. The crop harvesting machine of claim 12 wherein said slot-shaped opening has a length substantially equal to the length of stroke of said first hydraulic cylinder and is aligned substantially parallel to the direction of movement of said first hydraulic cylinder ram.

14. The crop harvesting machine of claim 13 wherein said holes are positioned such that the positioning of said pinning member through a first hole permits the utilization of substantially all of the stroke of said first hydraulic cylinder to vary the cutting angle of said cutterbar relative to the ground and the positioning of said pinning member through a second hole permits substantially none of said first hydraulic cylinder to be utilized so that said cutterbar can be locked in a fixed position.

15. The crop harvesting machine of claim 14 wherein said lift means includes a second hydraulic cylinder operable to effect said vertical movement of said header, said second hydraulic cylinder being connected to said hydraulic circuit.

16. The crop harvesting machine of claim 15 wherein both said first and second hydraulic cylinders are connected in parallel to the same hydraulic circuit, and said first hydraulic cylinder operating at a significantly lower pressure than said second hydraulic cylinder so that said first hydraulic cylinder can be operated through its entire effective length before a change in the pressure in said hydraulic circuit operates said second hydraulic circuit to effect a raising of said header relative to the ground.

* * * * *